(12) United States Patent
Olson et al.

(10) Patent No.: US 8,082,570 B2
(45) Date of Patent: Dec. 20, 2011

(54) METHOD AND APPARATUS FOR A SELF-TERMINATING SIGNAL PATH

(75) Inventors: Thomas A. Olson, Maryville, TN (US); David Kelma, Madisonville, TN (US); Joseph Lai, Rancho Palos Verdes, CA (US); Erdogan Alkan, Fayetteville, NY (US); David H. Jackson, Manlius, NY (US); Raymond W. Palinkas, Canastota, NY (US); Steven K. Shafer, Chittenango, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 85 days.

(21) Appl. No.: 12/629,255

(22) Filed: Dec. 2, 2009

(65) Prior Publication Data

US 2010/0244980 A1    Sep. 30, 2010

Related U.S. Application Data

(60) Provisional application No. 61/164,839, filed on Mar. 30, 2009, provisional application No. 61/186,603, filed on Jun. 12, 2009.

(51) Int. Cl.
*H04N 7/173* (2011.01)
(52) U.S. Cl. ............ 725/125; 725/126; 725/127; 326/30
(58) Field of Classification Search .......... 725/125–127; 326/30
See application file for complete search history.

(56) References Cited

U.S. PATENT DOCUMENTS

| | | |
|---|---|---|
| 3,790,909 A | 2/1974 | Le Fevre |
| 4,512,033 A | 4/1985 | Schrock |
| 4,520,508 A | 5/1985 | Reichert, Jr. |
| 4,648,123 A | 3/1987 | Schrock |
| 4,677,390 A | 6/1987 | Wagner |
| 4,961,218 A | 10/1990 | Kiko |
| 4,982,440 A | 1/1991 | Dufresne et al. |
| 5,010,399 A | 4/1991 | Goodman et al. |

(Continued)

FOREIGN PATENT DOCUMENTS

JP    55080989 A    6/1980
(Continued)

OTHER PUBLICATIONS

U.S. Appl. No. 61/164,839, filed Mar. 30, 2009.
(Continued)

*Primary Examiner* — Jason M Crawford
(74) *Attorney, Agent, or Firm* — Schmeiser, Olsen & Watts, LLP

(57) ABSTRACT

Presented are method and apparatus embodiments to terminate an interruptible signal path when the interruptible signal path is unterminated. The apparatus can comprise a signal path from a supplier-side port thru a user-side port, a signal source arranged to provide a signal to the conductor; and a signal circuit arranged in the interruptible signal path. The apparatus can determine when the signal path is unterminated and, in that case, interrupt and terminate the signal path by putting a signal switching device in the appropriate state and/or sending signals from the signal path to a prescribed signal level connection point. When a user device is not connected or connected improperly, or the signals through the signal path are otherwise unterminated, the interruptible signal path can be interrupted and terminated. The method and apparatus embodiments can be used in various combinations with multiple signal paths having multiple signal branches.

19 Claims, 8 Drawing Sheets

U.S. PATENT DOCUMENTS

| | | | |
|---|---|---|---|
| 5,058,198 A * | 10/1991 | Rocci et al. | 725/149 |
| 5,126,840 A | 6/1992 | Dufresne et al. | |
| 5,214,505 A | 5/1993 | Rabowsky et al. | |
| 5,231,660 A | 7/1993 | West, Jr. | |
| 5,369,642 A | 11/1994 | Shioka et al. | |
| 5,548,255 A | 8/1996 | Spielman | |
| 5,745,836 A | 4/1998 | Williams | |
| 5,815,794 A | 9/1998 | Williams | |
| 5,839,052 A | 11/1998 | Dean et al. | |
| 5,893,024 A | 4/1999 | Sanders et al. | |
| 5,937,330 A | 8/1999 | Vince et al. | |
| 5,950,111 A | 9/1999 | Georger et al. | |
| 5,970,053 A | 10/1999 | Schick et al. | |
| 6,014,547 A | 1/2000 | Caporizzo et al. | |
| 6,049,693 A * | 4/2000 | Baran et al. | 725/124 |
| 6,069,960 A | 5/2000 | Mizukami et al. | |
| 6,094,211 A | 7/2000 | Baran et al. | |
| H1858 H * | 9/2000 | Ibelings | 725/121 |
| 6,205,138 B1 * | 3/2001 | Nihal et al. | 370/388 |
| 6,348,837 B1 | 2/2002 | Ibelings | |
| 6,348,955 B1 | 2/2002 | Tait | |
| 6,373,349 B2 | 4/2002 | Gilbert | |
| 6,377,316 B1 | 4/2002 | Mycynek et al. | |
| 6,388,539 B1 | 5/2002 | Rice | |
| 6,425,132 B1 * | 7/2002 | Chappell | 725/107 |
| 6,495,998 B1 | 12/2002 | Terreault | |
| 6,498,925 B1 | 12/2002 | Tauchi | |
| 6,510,152 B1 | 1/2003 | Gerszberg et al. | |
| 6,560,778 B1 | 5/2003 | Hasegawa | |
| 6,570,928 B1 | 5/2003 | Shibata | |
| 6,587,012 B1 | 7/2003 | Farmer et al. | |
| 6,622,304 B1 | 9/2003 | Carhart | |
| 6,640,338 B1 | 10/2003 | Shibata | |
| 6,678,893 B1 | 1/2004 | Jung | |
| 6,683,513 B2 | 1/2004 | Shamsaifar et al. | |
| 6,725,462 B1 | 4/2004 | Kaplan | |
| 6,728,968 B1 | 4/2004 | Abe et al. | |
| 6,757,910 B1 | 6/2004 | Bianu | |
| 6,804,828 B1 | 10/2004 | Shibata | |
| 6,845,232 B2 | 1/2005 | Darabi | |
| 6,877,166 B1 | 4/2005 | Roeck et al. | |
| 6,928,175 B1 | 8/2005 | Bader et al. | |
| 7,003,275 B1 | 2/2006 | Petrovic | |
| 7,029,293 B2 | 4/2006 | Shapson et al. | |
| 7,039,432 B2 | 5/2006 | Strater et al. | |
| 7,162,731 B2 | 1/2007 | Reidhead et al. | |
| 7,283,479 B2 | 10/2007 | Ljungdahl et al. | |
| 7,454,252 B2 | 11/2008 | El-Sayed | |
| 7,505,819 B2 | 3/2009 | El-Sayed | |
| 7,530,091 B2 | 5/2009 | Vaughan | |
| 2001/0016950 A1 | 8/2001 | Matsuura | |
| 2002/0141347 A1 | 10/2002 | Harp et al. | |
| 2002/0144292 A1 | 10/2002 | Uemura et al. | |
| 2002/0166124 A1 | 11/2002 | Gurantz et al. | |
| 2004/0172659 A1 | 9/2004 | Ljungdahl et al. | |
| 2004/0229561 A1 | 11/2004 | Cowley et al. | |
| 2005/0034168 A1 | 2/2005 | Beveridge | |
| 2005/0183130 A1 | 8/2005 | Sadja et al. | |
| 2005/0283815 A1 | 12/2005 | Brooks et al. | |
| 2005/0289632 A1 | 12/2005 | Brooks et al. | |
| 2006/0015921 A1 | 1/2006 | Vaughan | |
| 2006/0205442 A1 | 9/2006 | Phillips et al. | |
| 2006/0282871 A1 | 12/2006 | Yo | |
| 2007/0288981 A1 | 12/2007 | Mitsuse et al. | |
| 2007/0288982 A1 | 12/2007 | Donahue | |
| 2008/0022344 A1 | 1/2008 | Riggsby | |
| 2008/0040764 A1 | 2/2008 | Weinstein et al. | |
| 2008/0127287 A1 | 5/2008 | Alkan et al. | |
| 2009/0031391 A1 | 1/2009 | Urbanek | |
| 2009/0047917 A1 | 2/2009 | Phillips et al. | |
| 2009/0077608 A1 | 3/2009 | Romerein et al. | |
| 2010/0095344 A1 * | 4/2010 | Newby et al. | 725/125 |

FOREIGN PATENT DOCUMENTS

| | | | |
|---|---|---|---|
| JP | 55132126 A | 10/1980 | |
| JP | 57091055 A | 6/1982 | |
| JP | 58101582 U | 6/1983 | |
| JP | 61157035 A | 7/1986 | |
| JP | 62151088 A | 7/1987 | |
| JP | 05191416 A | 7/1993 | |
| JP | 07038580 A | 2/1995 | |
| JP | 11069334 A | 3/1999 | |
| JP | 2001177580 A | 6/2001 | |
| JP | 2002044636 A | 2/2002 | |
| JP | 2003032655 A | 1/2003 | |
| JP | 2004071476 A | 3/2004 | |
| JP | 2004080483 A | 3/2004 | |
| JP | 2005005875 A | 1/2005 | |
| JP | 2007166109 A | 6/2007 | |
| JP | 2007166110 A | 6/2007 | |
| WO | WO-0024124 A1 | 4/2000 | |
| WO | WO-0172005 A1 | 9/2001 | |
| WO | WO-0233969 A1 | 4/2002 | |
| WO | WO-02091676 A1 | 11/2002 | |

OTHER PUBLICATIONS

U.S. Appl. No. 61/186,603, filed Jun. 12, 2009.
Toner Cable Equipment, Inc., Self Terminating Wall Tap from Toner Cable Equipment, 3 pgs.
PCT/US2010/024094; International Search Report and Written Opinion—Date of Mailing: Jul. 29, 2010; Applicant's Reference No. 205_251PCT (ID-1402-PCT); 9 pp.

* cited by examiner ns # US 8,082,570 B2

METHOD AND APPARATUS FOR A SELF-TERMINATING SIGNAL PATH

CROSS REFERENCE TO RELATED APPLICATIONS

This application claims the benefit of U.S. Provisional Application No. 61/164,839, filed Mar. 30, 2009, and U.S. Provisional Application No. 61/186,603, filed Jun. 12, 2009. U.S. Provisional Application No. 61/164,839 and U.S. Provisional Application No. 61/186,603 are incorporated by reference in their entirety.

BACKGROUND OF THE INVENTION

This invention relates generally to a bidirectional cable television ("CATV") network that provides services to a user, and more specifically, it relates to reducing noise ingress resulting from electrical/electromagnetic signals entering the CATV network through improperly terminated tap and splitter ports.

The CATV industry has evolved into a provider of many services. These services not only include traditional analog television programming, but also data services that include, digital television programming, internet services, home security services, voice over internet (VOIP) services, pay-per-view monitoring/billing, and others yet to be discovered. All of these services are provided by transferring alternating electrical current signals ("signals") to and from a user's facility, such as a home or business.

The CATV signals are delivered to these users from a head end along feeder cables. A head end is a facility for processing and distributing signals over a CATV network. Normally, the head end facility houses electronic equipment used to receive and re-transmit video and other signals over the local cable infrastructure. The feeder cables extend from the head end and branch off to the user's facility at a tap having one or more ports. A drop cable, which is a single coaxial cable, is then passed from one of these ports to a user subsystem on or in the user's facility.

At a time when televisions were considered a luxury and when the cable television industry only provided television services, the drop cable may have run directly into one room of the facility to provide signals to one television. In other words, there may have been no splitters between the user tap and the television. Due to the proliferation of televisions and other user devices that utilize the cable television cables, most user facilities now have at least one splitter that allows the signals to pass from the single drop cable into two or more distribution cables, each distribution cable having its own port on the splitter. Additional splitters may be placed on any of these distribution cables for the addition of more distribution cables. Because even the most technologically advanced homes rarely have a television or other user device for each of these distribution cables and their respective splitter ports, many of these distribution cables and unconnected splitter ports, go unused and unterminated to gather undesirable signals present throughout the home. The term "unterminated port" may be used interchangeably for an unused/unterminated tap port, for an unused/unterminated user port physically located on a splitter, for an unused/unterminated end connector, and for a splitter port that is connected to a distribution cable, which is also unused and not connected to a user device. A distribution cable connected to an unused wall jack located in a separate room of a facility is an example of a distribution cable with an unused/unterminated end connector. This wall jack is an end connector that is essentially an extension of the user port on the splitter.

Each of these unterminated ports can allow electrical/electromagnetic signals to enter the CATV network as ingress noise. The CATV industry has been plagued with ingress noise from each user's facility. Any electrical/electromagnetic signals present in the facility can be passed into any unterminated ports, and hence, the CATV network. These electrical/electromagnetic signals can be inadvertently generated by traditional electrical devices with alternating electrical currents, such as garbage disposals, welders, blower motors, etc. These electrical/electromagnetic signals can also include intentionally generated radio signals transmitted by CB radios, cell phones, personal communicators, wireless telephones, wireless baby monitors, etc. While some of these electrical/electromagnetic signals might be desirable for an intended purpose, none of these signals are desirable if/when they are introduced into the CATV network as ingress noise.

For the purpose of clarity, the term "undesirable signals" is used herein to describe any electrical/electromagnetic signals that are not desired within the CATV network. Thus, undesirable signals can include any signals in the CATV network that are not intentionally provided therein. Similarly, the term "ingress noise" is used herein to describe any undesirable signals present in the CATV network that interfere with desired signals within the CATV network. The term "desired signals" is used herein to describe those signals intended to be present within the CATV network. "Noise ingress" is used to describe the act of the ingress noise entering the CATV network and interfering with desired signals.

As mentioned above, the desired signals are delivered to and are received from the user's facility as desired alternating electrical current signals. Ingress noise, without processing or filtering, for example, interacts with the desired signals to create a resulting signal that may be unfit for use, or unusable, by the user.

Typically, the coaxial cable used in a CATV network is designed to contain the desired signals and protect them from undesirable signals that could cause ingress noise. It accomplishes this goal using an electromagnetic shield that can include a thin, conductive foil, and/or braided conductive metal that surrounds the primary conductor. While the coaxial cable does not protect the desired signals perfectly, on a practical level it generally succeeds.

On the other hand, unterminated ports can often leave the CATV network exposed to ingress noise. A port, like a coaxial cable, has a center conductor and a shielding element. Such ports attach to, or are built into, one end of a shielded signal path, such as a coaxial cable, a tap, or a splitter. Any time these conductors in such ports exist in an unprotected state, the conductors and/or the ports can be exposed to the undesirable signals that can become ingress noise that alters the desired signal properties.

When a port built into a splitter is properly connected to a coaxial cable, and ultimately a user device (e.g., television, television tuner, modem, VOIP server, etc.), the splitter, the connectors, the coaxial cables, and/or the end device increase the desired signals relative to the undesirable signals by attenuating the undesirable signals at the paths of entry into the CATV network. However, as discussed above, when such a port is unterminated it is also unshielded, so the CATV network is exposed to undesirable signals at the port that can cause noise ingress. Similarly, if a port is connected, but connected improperly, the CATV network may also be exposed to undesirable signals. The term "unterminated port"

will be used herein to include those ports that are not connected to a user device or are improperly connected to a user device.

As can be imagined, ingress noise can pose a significant and costly problem for the cable industry. When undesirable signals enter the CATV network as ingress noise at an unterminated port, not only are the performance of the tap or splitter affected, but ingress noise can enter and disrupt larger portions of the CATV network. In particular, ingress noise flowing into the CATV network from the user's facility in this manner can accumulate and merge with upstream data created by the user's Internet uploads and created by voice transmissions associated with VOIP, etc., to increase the overall noise level, to decrease the overall ratio of desired signals-to-overall noise, and be transmitted to a head end of the CATV network.

The increased noise levels and decreased signal-to-noise ratios caused by the ingress noise can cause degradation of the transmission quality, and in some cases, it can cause the CATV network to fail in transmission. The ingress noise can also cause problems with downstream signals, such as those for analog television, for instance, by altering electrical signals in a manner that causes picture degradation. Failure of digital signals, such as internet, voice over internet protocol (VOIP) and digital television, can take the form of delays in transmission of internet data (e.g., upload or download), or temporary losses of picture. These failures occur when data packets are received at user devices with errors, causing the data packets to be resent, further causing more traffic and congestion in the CATV network. As can be imagined, diagnosing any of these problems is expensive, and fixing the problems is also expensive once they are identified.

Presently, a solution for reducing ingress noise at ports uses a mating "terminating" connector that is physically attached to an otherwise unterminated port. Attaching the terminating connector to the unterminated port completes a circuit that allows signals to pass. The terminating connector causes a 75 Ohm resistance to be mechanically inserted between the center conductor of a port and a ground. In this way, when a port is disconnected from another connector, the signal is terminated to ground at the port, closing an opportunity for noise ingress. However, problems with this setup can arise. For instance, a port can be connected to a mating coaxial cable so the signal is allowed to flow through it, with no user device attached at the end of the coaxial cable. In this case, undesirable signals can ingress into the CATV network at the unterminated end of the coaxial cable and pass through the port. Alternatively, where a terminating connector is connected improperly (e.g., not fully attached, attached incorrectly, etc.), noise can ingress and a faulty signal can pass.

It would be advantageous to reduce or prevent ingress noise by appropriately terminating the port when it is improperly connected as well as when it is unconnected.

SUMMARY OF THE INVENTION

A self-terminating signal path through a port is provided to interrupt and terminate (e.g., automatically) the signal path to a prescribed signal level connection point when the signal path is found to be unterminated.

In one embodiment of the invention, an apparatus for reducing noise ingress is provided. The apparatus comprises at least one signal path extending from a supplier-side port through a user-side port, a signal source coupled to each of the signal paths, and at least one signal circuit arranged in one of the interruptible signal paths. Each interruptible signal path comprises a conductor and a prescribed signal level connection point (e.g. a ground). The signal source is arranged to provide a signal to the conductor. Each signal circuit is configured to determine when the interruptible signal path is unterminated, and to interrupt and terminate the interruptible signal path to the prescribed signal level connection point when the interruptible signal path is determined by the signal circuit to be unterminated.

In another embodiment, a signal splitter is provided to reduce noise ingress. The signal splitter comprises an interruptible signal path, a signal detector, a signal switching device arranged on a first branch of the one or more signal branches, and a coupler circuit. The interruptible signal path extends from a supplier-side port through an output of a user-side port. The interruptible signal path also comprises one or more signal branches. The signal detector detects a signal level on the interruptible signal path at the user-side port. The signal switching device selectively interrupts the first branch of the interruptible signal path. The coupler circuit performs AC coupling between the signal detector and the signal switching device. The signal detector, the coupler circuit, and the signal switching device connect in series to at least the first branch of the one or more signal branches in the interruptible signal path.

In yet another embodiment, a method is presented to terminate a port in order to reduce or prevent ingress noise. A signal is applied to a conductor in at least one interruptible signal path extending through a user-side port. Each interruptible signal path has one or more signal branches. It is determined whether each of the interruptible signal paths is terminated on a user side of a reference point. Then, each interruptible signal path is interrupted and terminated at a termination point when the interruptible signal paths are unterminated on the user side of the reference point.

In other embodiments, the method and apparatus operate in various combinations to accommodate multiple signal paths having multiple signal branches.

DETAILED DESCRIPTION OF THE INVENTION

Figure 1:
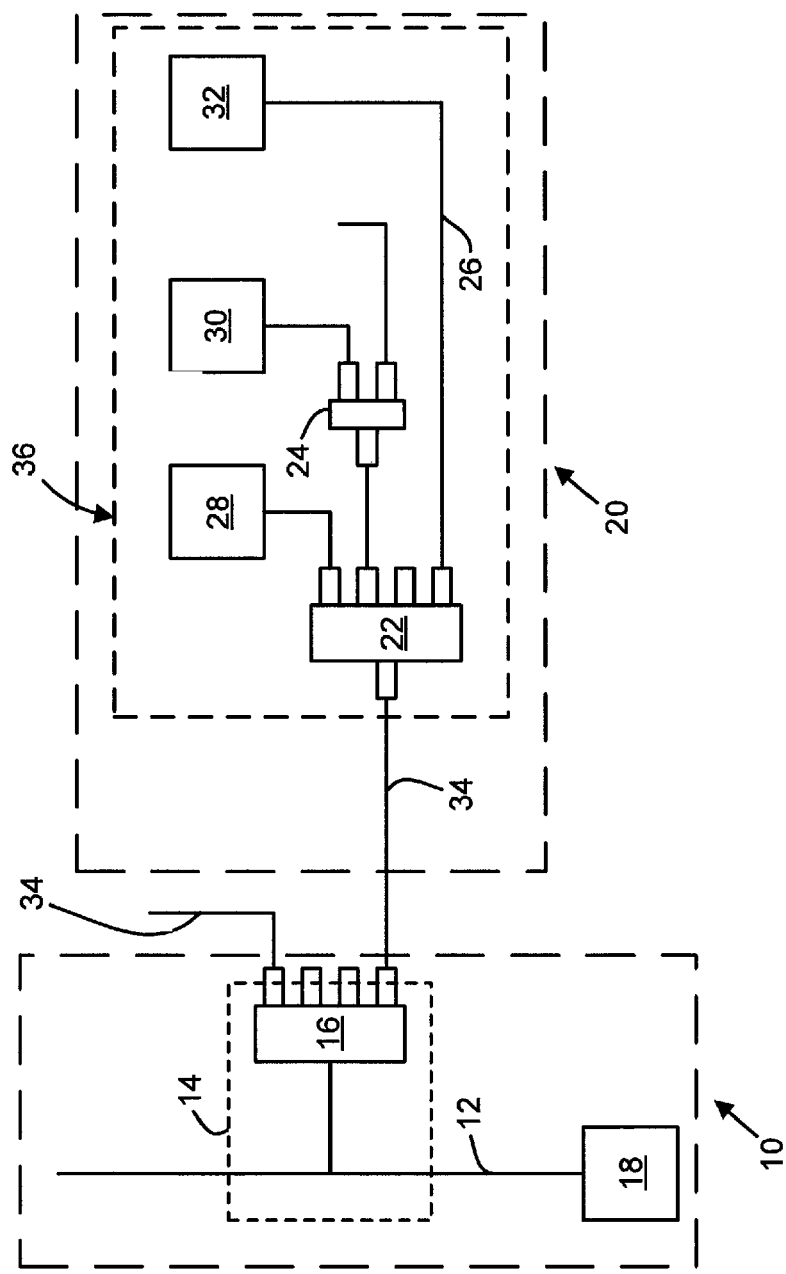
FIG. 1 is a simplified schematic view of an exemplary CATV network showing potential locations to terminate ports in order to address ingress noise, according to one embodiment of the invention.

Embodiments of methods and apparatus according to the invention are described in the context of a CATV network used to supply a residential or other user facility. However, the general principles and apparatus may be extended to other types of architectures and networks, whether broadband, narrowband, or otherwise.

It will also be appreciated that while described generally in the context of a residential or home domain, the present invention may be readily adapted to other types of environments (e.g., commercial/enterprise, government/military, etc.) as well.

In the detailed description that follows, identical components have been given the same reference numerals, and in order to clearly and concisely illustrate embodiments according to the present invention, certain features may be shown in schematic form.

Referring to the simple schematic of FIG. 1, a bidirectional cable subsystem 10 feeds downstream signals to a user subsystem 20. Possible signals include, but are not limited to alternating current, direct current, and electromagnetic waves. Downstream signals are fed from a head end 18 by a feeder cable 12. Periodically, the downstream signals split off to a user subsystem 20 at a feeder tap 14 and a directional coupler 16, where upstream signals also pass from the user subsystem 20 toward the head end 18. A drop cable 34 carries the downstream signals from the directional coupler 16 of the feeder tap 14 to a splitter 22 within the user's facility 36. From the splitter 22, the user's facility 36 is wired with coaxial cables 26 to connect user devices such as television sets 28, 30, and a cable modem 32. One or more secondary splitters 24 might also be used to connect other television sets or other user devices.

As shown in the exemplary CATV network (e.g., subsystems 10, 20) of FIG. 1, undesirable signals can intrude at the feeder tap 14 at the directional coupler 16, or in the user subsystem 20 at the splitters 22 and 24. As described herein, whenever a port is unterminated, undesirable signals can enter.

Figure 2:
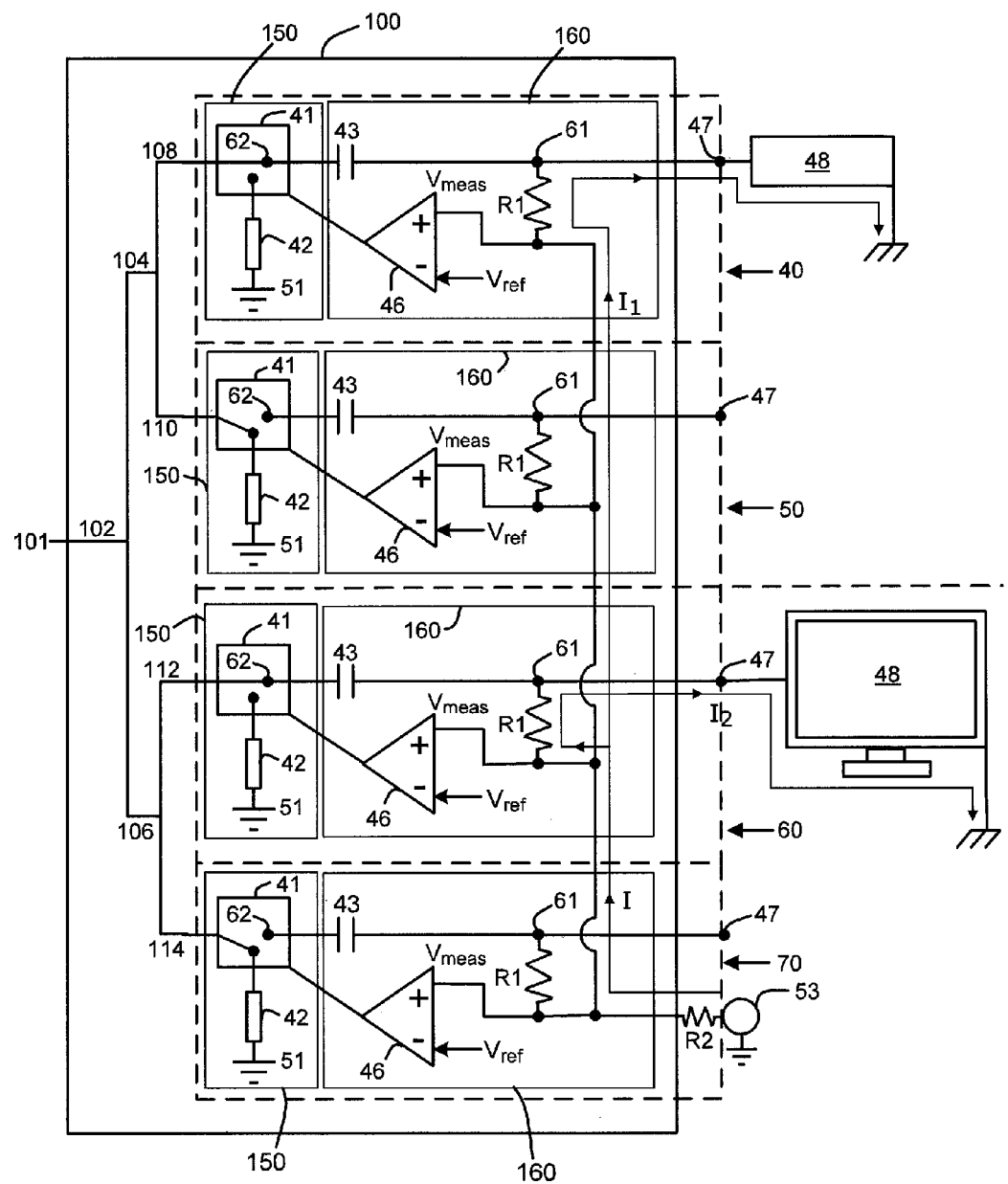
FIG. 2 is a schematic diagram of a splitter with self-terminating ports, according to one embodiment of the invention.

Referring to FIG. 2, a 4-way, self-terminating splitter 100 is provided that detects unterminated ports and terminates them in order to reduce or prevent such undesirable signals from entering. The 4-way, self-terminating splitter 100 has a supplier-side port 101 on signal branch 102, splitting to signal branches 104 and 106, which further split to signal branches 108, 110, 112, and 114. On signal branches 108, 110, 112, and 114 are ports 40, 50, 60, and 70, respectively. The seven signal branches 102, 104, 106, 108, 110, 112, and 114 comprise four signal paths 102/104/108, 102/104/110, 102/106/112, and 102/106/114. One or more signal circuits 150/160 are integrated with the splitter 100 on signal branches 108, 110, 112, and 114, at user-side ports 40, 50, 60, and 70, to detect unterminated ports (e.g., unterminated signal paths) and terminate the (previously) unterminated ports among the user-side ports 40, 50, 60, 70. Each signal circuit 150/160 can be grouped into at least two portions. In one embodiment, a signal circuit 150/160 is grouped into a first portion being a sensor circuit 160 and a second portion being a termination circuit 150. The sensor circuit 160 detects unterminated ports, and the termination circuit 150 terminates unterminated ports.

The termination circuit 150 comprises a signal switching device 41, a terminating signal path 42, and a ground 51. The signal switching device 41 may be any one of the known analog or digital single pole, double throw (SPDT) switches. At each of user-side ports 40, 50, 60, and 70, the signal switching device 41 is arranged in the respective signal branch 108, 110, 112, 114. The signal switching device 41 has a closed state, in which the signal switching device 41 completes the circuit to pass signals to the output 47, and an opened state, in which it interrupts the respective signal branch 108, 110, 112, 114 and terminates the respective signal path 102/104/108, 102/104/110, 102/106/112, 102/106/114 by completing the terminating signal path 42 to ground 51. In one embodiment, a resistance of the terminating signal path 42 is approximately 75 ohms to match the characteristic impedance of the CATV system. This resistance in the terminating signal path 42 can be adjusted as appropriate depending on the characteristic impedance of the particular system, as one skilled in the art would recognize. Further, the terminating signal path 42 is shown coupled to the ground 51 in FIG. 2 so that the ground 51 terminates the signal path 42 by reducing the signal to a prescribed voltage level. However, the ground 51 can be a connection point where the signal is adjusted to other prescribed signal levels (e.g., voltage levels or electrical current levels) in order to terminate the signal path and produce an improved signal (e.g., reduce ingress noise or reflection).

The sensor circuit 160 comprises a blocking capacitor 43, a resistor R1, and a signal comparison device 46, such as but not limited to a simple comparator, a dedicated voltage comparator chip, a microprocessor, or other processor, each of which is capable of comparing two signal characteristics (e.g., voltage or current), and switching its output to indicate which signal characteristic is larger. The blocking capacitor 43 is arranged in the signal branch 108, 110, 112, 114 before the output 47, to block the passage of a direct electrical current I (which will be discussed more fully below) to the supplier-side port 101. A first input of the signal comparison device 46 is connected to the signal branch 108, 110, 112, 114 between the output 47 and the blocking capacitor 43 by the resistor R1 and to a signal source, such as a voltage source 53, as illustrated. A second input of the signal comparison device 46 is connected to a source providing a reference signal characteristic, such as a voltage Vref. The voltage Vref is compared to a voltage Vmeas to operate the signal switching device 41, as will be described more fully below. The voltage Vmeas is measured at the first input to the signal comparison device 46, and is representative of the signal on the interruptible signal path 102/104/108, 102/104/110, 102/106/112, 102/106/114. At user-side ports 40 and 60, user devices 48, such as, but not limited to a television set, a television receiver/tuner, and a modem, are connected to the output 47. All the user-side ports 40, 50, 60, and 70 are connected to the voltage divider input voltage source 53 that can be connected through an optional common current limiting resistor R2. In one embodiment, a power supply (e.g., voltage source or current source) such as but not limited to the voltage source 53 can be part of or integral to the splitters 22, 24 (e.g., upon manufacture or assembly). In an alternative embodiment, the power supply (e.g., voltage source or current source) such as but not limited to the voltage source 53 can be attached or electrically coupled to the splitters 22, 24 (e.g., upon installation).

The sensor circuit 160 senses, or determines, when the user device 48 is properly connected, and the termination circuit 150 either passes signals through the signal branch 108, 110, 112, 114 and the output 47, or else directs signals to ground 51 accordingly, in response to the sensor circuit 160. As shown in FIG. 2, the connection to the user device 48 causes a portion of the current I to pass through the resistor R1, and through the signal branch 108, 112 to the user device 48. When the current I passes to the user device 48, the measured voltage Vmeas is lowered at the first input of the signal comparison device 46. At the signal comparison device 46, the measured voltage Vmeas, having been lowered, is less than the reference voltage Vref, and the signal comparison device 46 sends a control signal to the signal switching device 41 causing the signal switching device 41 to remain closed. The closed signal switching device 41 completes the signal branch 108, 112, and hence the respective signal path 102/104/108, 402/106/112, to the connected user device 48.

If the user device 48 is not connected, such as at the user-side ports 50 and 70 shown in FIG. 2, sufficient current is not drawn off the output 47. The voltage, then, does not drop at the resistor R1, and Vmeas is higher than the reference voltage Vref at the signal comparison device 46. The signal comparison device 46 sends a signal to the signal switching device 41 causing it to open, which interrupts the respective signal path 102/104/110, 102/106/114, and terminates each of the respective signal paths 102/104/110, 102/106/114 to the ground 51. Similar operations of the signal circuit 150/160 can occur if the user device is connected improperly. For example, when the user device 48 is improperly connected to draw some current, but not a sufficient amount so that the voltage Vmeas remains above the reference voltage Vref, the signal comparison device 46 sends the control signal such that the signal switching device 41 is in the open position. In this case, the automatic termination prevents noise from ingressing at a faulty connection, or prevents a faulty signal from traveling to/from the user device 48.

When in the opened state, the signal switching device 41 can reset to the closed state. Interrupting the power supplied from the voltage source 53 is one way to reset the signal switching device 41 to the closed state. For instance, the voltage source can be configured to reset or interrupt on a periodic basis—intermittently, repeatedly, aperiodically, (e.g., on a scale of seconds, minutes, or hours)—or in response to a sensed condition (or a user action). Other ways to interrupt the voltage source and/or reset are conceived or possible, and are considered within the scope of the invention. For instance, the signal switching device 41 might be configured to reset periodically. Other circuit components might also be added to accomplish resetting the signal switching device 41 appropriately, the addition of which would be understood by one skilled in the art.

While FIG. 2 illustrates the present invention embodied as a circuit integrated with or connected to each user-side port of a 4-way splitter dividing downstream signal to separate user devices in a user's facility, it will be recognized that other embodiments are conceived within the scope of the present invention, such as, but not limited to 8-way splitters, two-way splitters, three-way splitters, and various connectors or other devices with ports. Furthermore, it will be recognized that electrical equivalents of the circuit shown in FIG. 2 may be utilized. For example, a resistor of a given resistance value may be replaced by two series resistors ½ that value (since series resistors add their resistance). Similarly, other types and combinations of components that provide the desired functionality may be used consistent with the invention.

It will also be appreciated that the circuit of FIG. 2 may be rendered in literally any physical form, including without limitation: (i) as a circuit composed of discrete circuit elements (i.e., resistors, capacitors and inductors); (ii) as an integrated circuit, either in a stand-alone form or integrated with a parent device, such as with a splitter or tap device. A myriad of different configurations will be recognized by those of ordinary skill given the present disclosure.

An embodiment of a method of controlling a signal path through a port according to the invention will now be described. The method embodiment shown in FIG. 3 can be implemented in and will be described using the user-side port 40 embodiment shown in FIG. 2, however, the method embodiment is not intended to be limited thereby.

Figure 3:
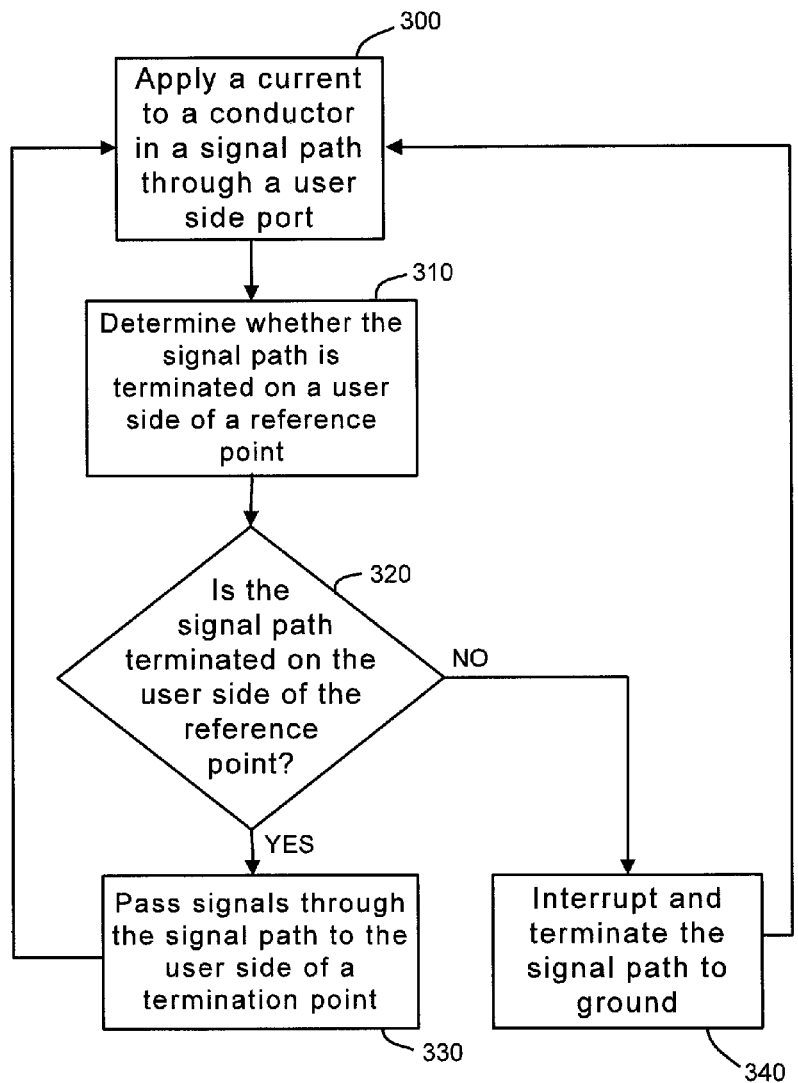
FIG. 3 is flow chart illustrating the method of terminating a signal path through a user-side port, according to one embodiment of the invention illustrated by FIG. 2.

As shown in FIG. 3, a current can be applied to a conductor in an interruptible signal path 102/104/108 through a user-side port 40 according to step 300. In one embodiment, the exemplary splitters 22, 24 can determine, inside the splitter 22, 24, whether the signal path that goes through and exits the user-side port is terminated outside (e.g., downstream) the user-side port according to step 310. In one embodiment, it can be determined whether the signal path 102/104/108 is terminated on the user side of a reference point, according to step 310. The user side is the downstream side of the reference point, which is also the side toward the connectable user devices (e.g., user device 48). In FIG. 2, the reference point 61 can be a point where the sensor circuit 160 connects to the signal branch 108, so a user device 48 attached to output 47 terminates the signal path on the user side of the reference point 61. According to the circuit embodiment of FIG. 2, and as described above, the determination can be made by the sensor circuit 160, by comparing the measured voltage Vmeas at the signal comparison device 46 with a reference voltage Vref. When a user device 48 is properly connected, that user device 48 will draw current, causing a voltage drop across resistor R1. The resulting measured voltage Vmeas at the signal comparison device 46 will be lowered. The signal comparison device 46 determines that the signal path 102/104/108 through the user-side port 40 is terminated when the measured voltage Vmeas is lower than the reference voltage Vref. When the user-side port 40 is unterminated (e.g., the user-side port 40 is unterminated in the port, at a user device 48 connected to an output 47 of the user-side port 40, or there between), the voltage across resistor R1 and the voltage Vmeas at the signal comparison device 46 are higher. The signal comparison device 46 sends an appropriate control signal to the signal switching device 41 in the termination circuit 150, causing the signal switching device 41 to either close or open as appropriate in order to either pass signals through the user-side port or reduce ingress noise by automatically terminating a signal path.

Other methods of determining whether the user-side port 40 is terminated on the user side of the reference point 61, or through its output 47, are within the scope of the invention, such as, but not limited to comparing signal characteristics other than voltage with a reference value. For instance, resistance can be measured and compared against a reference resistance value in order to determine if the user-side port 40 is terminated. Similarly, current of a signal in the signal branch 108, 110, 112, 114, or in a signal circuit 150/160 connected to the signal branch 108, 110, 112, 114, can be measured and compared against a reference current value in order to determine if the user-side port 40 is terminated. For example, comparing the voltage Vmeas with the voltage Vref at the signal comparison device 46 can be considered related to or equivalent to measuring and comparing current at, for instance, the output 47. However, other circuit arrangements can measure and compare signal characteristics in order to determine whether user-side port 40 is terminated as well.

When it is determined that the signal path is terminated downstream of the user-side port, decision box 320 passes control to step 330. When it is determined that the signal path is not terminated downstream of the user-side port, decision box 320 passes control to step 340.

Still referencing user-side port 40 of FIG. 2, according to decision box 320, if the signal path 102/104/108 is determined to be terminated on the user side of the reference point 61 (e.g., in the sensor circuit 160, the measured voltage Vmeas is less than the reference voltage Vref), then the signals are passed through the signal path 102/104/108 to the user side of a termination point 62. In FIG. 2, the termination point 62 is a point in the signal switching device 41 of the termination circuit 150 where the signal path 102/104/108 can be interrupted. A control signal from the signal comparison device 46 causes the signal switching device 41 to set to (or remain set to) a closed state, which completes the signal path to the output 47, and passes signals to the user side of the termination point 62, according to step 330. If the user-side port 40 is determined to be unterminated (e.g., the measured voltage Vmeas is higher than the reference voltage Vref), according to decision box 320, then the termination circuit 150 will interrupt the signal path 102/104/108 and terminate the user-side port 40. A control signal will travel from the signal comparison device 46 to the signal switching device 41, causing the signal switching device 41 to set to an opened state. When the signal switching device 41 sets to an opened state, it interrupts the signal path 102/104/108 and terminates it to ground 51, according to step 340.

At the end of steps 330 and 340, the process repeats starting with step 300. When the signal switching device 41 remains closed so the signals pass through the signal path 102/104/108 to the user side of the termination point 62 (e.g., through the output 47), according to step 330, the method of terminating the signal path 102/104/108 through the user-side port 40 continually loops with the possibility the user device 48 is disconnected so the user-side port 40 will become unterminated, and then subsequently terminated by the termination circuit 150. When the signal switching device 41 is set to the opened state to interrupt and terminate the signal path by completing the signal path to ground 51, according to step 340, looping the method results in the signal switching device 41 remaining set in the opened state because when the user-side port 40 is terminated at the termination point 62 in the user-side port 40, and not to the user side of the reference point 61, as through the output 47, the answer to decision box 320 is "no". The signal path 102/104/108 is interrupted and terminated to ground, according to step 340.

Alternatively however, in one embodiment, the signal switching device 41 can reset, as for example, described above. In that case, looping the method can result in the signal switching device 41 being set to either the opened or closed state, depending on whether a user device 48 is connected to terminate the signal path 102/104/108 through the output 47. In another embodiment, from step 330 and step 340 the method can end.

In one embodiment, when an additional user device 48 is subsequently connected to a signal path terminated by the termination circuit 150 in step 340 (e.g., the additional user device 48 becomes connected to the user port 50), looping the method shown in FIG. 3 can result in transmitting signals down the signal path through the user port 50 (e.g., the signal circuit 150/160) to the now connected additional user device 48. In one embodiment for example, changing the signal switching device 41 (e.g., here in the user port 50) to the closed state can directly or automatically occur responsive to the connection of the additional user device 48.

Other embodiments of the present invention are envisaged that will further increase the quality of signals. For example, it has been determined that reflections can be caused within each of the branches of a splitter. Some energy from signals passing through the splitter can reflect at each split, to cause undesirable signals and/or ingress noise that can deteriorate the signal quality in the CATV network. Accordingly, it has been determined that the quality of the desired signals can be increased even further when a signal path is terminated upstream, or as far upstream as possible, from a signal branch, or as many signal branches as possible, within the splitter.

Figure 4:
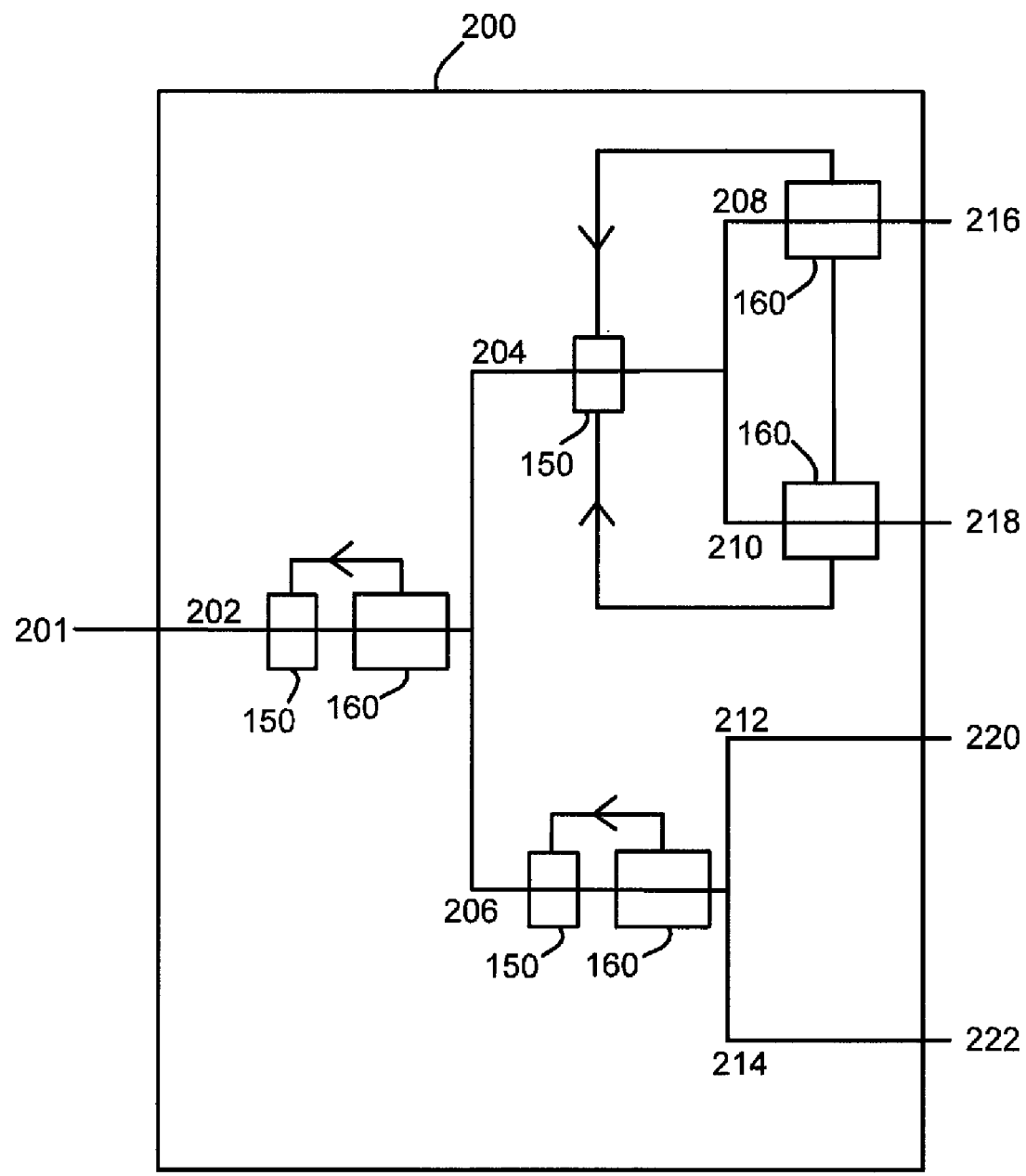
FIG. 4 is a schematic diagram of a splitter with self-terminating signal paths, according to one embodiment of the invention.

Exemplary embodiments of circuits and methods according to the invention that can terminate signals farther upstream (e.g., closer to the supplier-side port) will now be described. Referring to FIG. 4, embodiments to terminate signals farther upstream, closer to supplier-side port 201, are illustrated wherein the terminating circuit 150 represented in FIG. 2 can be moved to alternate positions within a splitter 200. A first of such embodiments is described with reference to the signal branches 204, 208, and 210 that lead to user-side ports 216 and 218. In this embodiment, the sensor circuit 160 is positioned on each of signal branches 208 and 210. The termination circuit 150 is positioned farther upstream on signal branch 204. In this case, the sensor circuits 160 and termination circuit 150 can be configured so that when sensor circuits 160 determine that either user-side port 216 or user-side port 218 (or both) is properly connected to a user device (not shown), the termination circuit 150 allows signals to pass to signal branches 208 and 210. In this configuration, only when neither user-side port 216 nor user-side port 218 is properly connected to a user device (not shown) does the termination circuit 150 interrupt the signal paths and terminate signals to ground. Noise can therefore ingress when one of the user-side ports 216 or 218 is properly connected to a user device (not shown), but the other is not. In an alternative embodiment, the termination circuit 150 and sensor circuits 160 can be configured so that the termination circuit 150 interrupts the signal paths and terminates signals to ground when either user-side port 216 or 218 is unterminated. In this alternative configuration, noise ingress due to an unterminated port is beneficially prevented, but desired signals might also be prevented when one of user-side ports 216 and 218 is properly connected while the other is unterminated. In each configuration, positioning the termination circuit 150 upstream from a split lessens the amount of ingress noise (e.g., reflection of signals). Requirements to implement each of the configurations would be recognized and understood by one skilled in the art, given the description of the implementation of the configuration with respect to FIG. 2. Hence, these requirements are not discussed herein.

Referring to the signal branches that lead to user-side ports 220 and 222, FIG. 4 illustrates a second embodiment wherein the termination circuit 150 is positioned farther upstream than shown in FIG. 2. In this embodiment, both the sensor circuit 160 and termination circuit 150 are positioned on signal branch 206 upstream from signal branches 212 and 214. Here, the termination circuit 150 and sensor circuit 160 can be configured to function the same as in FIG. 2, with the exception of being repositioned farther upstream. Entailing from this exception, when a user device (not shown) is properly connected to either user-side port 220 or user-side port 222, or both, the sensor circuit 160 detects the proper connection to at least one of the user-side ports 220, 222, sends the appropriate control signal to the termination circuit 150, and the termination circuit 150 passes the signal across signal branches 212 and 214. When a user device (not shown) is not properly connected to either of the user-side port 220 or 222, the termination circuit 150 interrupts the signal paths and terminates the signals to ground. Here again, noise can ingress when one of the user-side ports 220 or 222 is properly connected to a user device (not shown), but the other is not. However, positioning the termination circuit 150 upstream of signal branches 212 and 214 reduces reflection.

FIG. 4 further illustrates that many arrangements are possible, some being a combination of one or more of the embodiments described herein supra. As described herein, any combination of placement of termination circuits 150 with sensor circuits 160 can be implemented. However, as a practical matter, these arrangements are determined based on a desired balance between reducing noise caused by reflection, reducing noise caused by ingressing signals, and reducing cost of building and implementing the splitters 100, 200. Limiting components and configuration intricacy generally results in lower material and manufacturing expense; positioning a termination circuit 150 closer to the supplier-side port 201 lessens the reflection traveling upstream to enter the CATV network; and positioning the termination circuits 150 closer to the user-side ports 216, 218, 220, and 222 lessens the noise ingress.

For improved or the best reduction of reflection, a termination circuit 150 can be positioned upstream from as many splits as possible (e.g., upstream from signal branches 204 and 206), toward the supplier-side port 201. For improved or the best reduction of noise ingress, a termination circuit 150 can be positioned as close to each user-side port 216, 218, 220, and 222 as possible, on signal branches 208, 210, 212, and 214. FIG. 2 illustrates such an embodiment, in which both a sensor circuit 160 and a termination circuit 150 can be positioned on each of branches 108, 110, 112, and 114.

Figure 5:
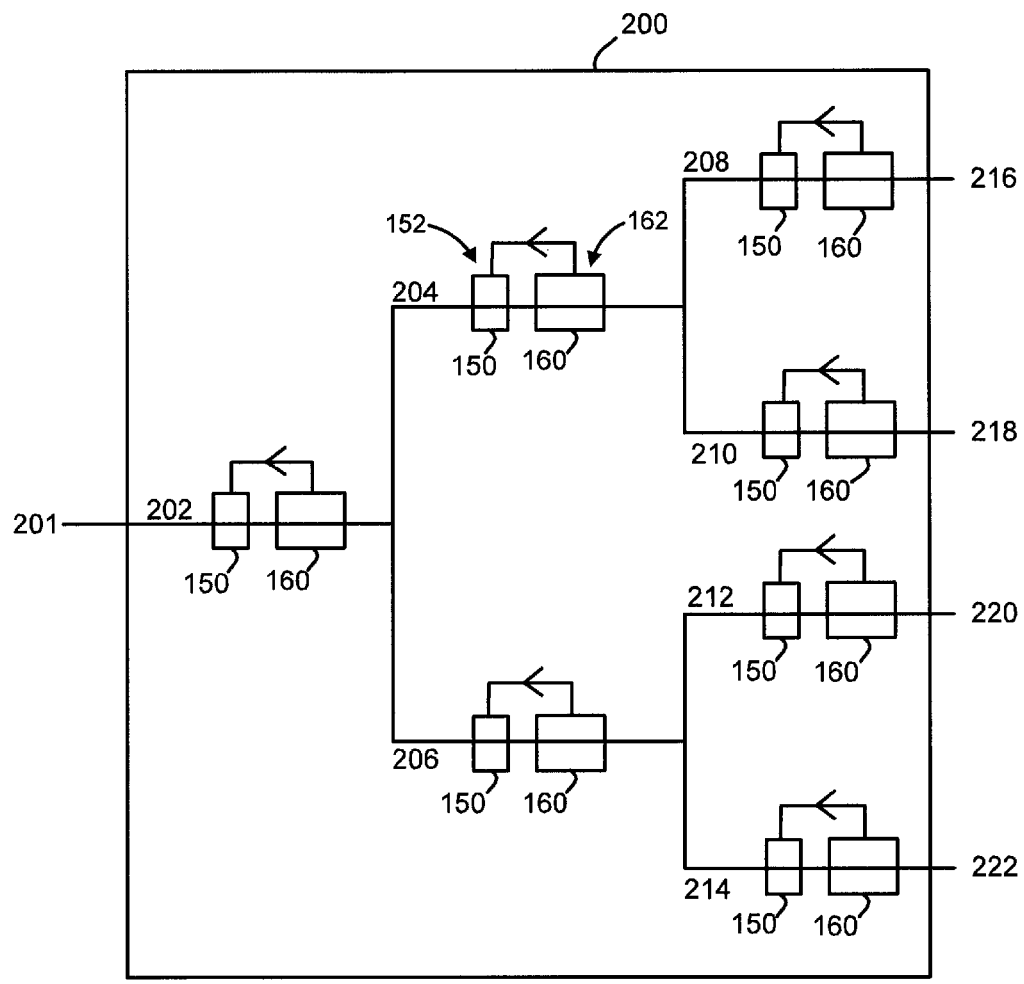
FIG. 5 is a schematic diagram of the splitter illustrated in FIG. 4, according to an alternate embodiment of the invention.

To increase or maximize control over reducing both reflection and noise ingress, termination circuits 150 can be positioned on every branch. For instance, as illustrated in FIG. 5, noise can be prevented from ingressing and traveling upstream right at user-side ports 216, 218, 220, and 222. Furthermore, if both user-side ports 216 and 218 are unterminated (e.g., not properly connected to a user device), then the termination circuit 150 on signal branch 204 can terminate them. Similarly, if user-side ports 220 and 222 are unterminated, then the termination circuit 150 on signal branch 206 can terminate them. In these cases, noise is still prevented from traveling upstream from the splitter 200, and reflection is prevented from traveling upstream from the branch 208/210 split, and from the branch 212/214 split. Lastly, if all four user-side ports 216, 218, 220, and 222 are unterminated (e.g., not properly connected to a user device), then the termination circuit 150 on supplier-side port signal branch 202 can terminate them. In this case, noise is prevented from traveling upstream from the splitter 200, and reflection is prevented from traveling upstream from any split in the splitter. In each of the cases discussed in this paragraph, the termination circuit 150 farthest upstream that terminates signals does so instead of, or in addition to, the intermediate termination circuits 150 and/or the termination circuits 150 farthest downstream that are terminating signals. Such increased exemplary control shown in FIG. 5 can come at the cost of additional material and manufacturing expense.

Each particular configuration might require a different particular arrangement in logic circuitry. As described previously, the requirements to implement such circuitry is recognized and understood by one skilled in the art, given the description of the implementation of the configuration with respect to FIG. 2. Other variations due to different combinations of the above-described features will also be evident to one skilled in the art.

The method of terminating a signal path through a user-side port, as described herein above with reference to FIG. 3, can also vary with the particular placements (e.g., arrangement or configuration) of the termination circuits.

An embodiment of a method of reducing ingress noise on a signal path through a splitter in a CATV system, according to the invention will not be described. The method embodiment shown in FIG. 6 can be implemented in and will be described using a termination circuit 150 on signal branch 204 as shown in FIG. 5; however, the method embodiment is not intended to be limited thereby.

Figure 6:
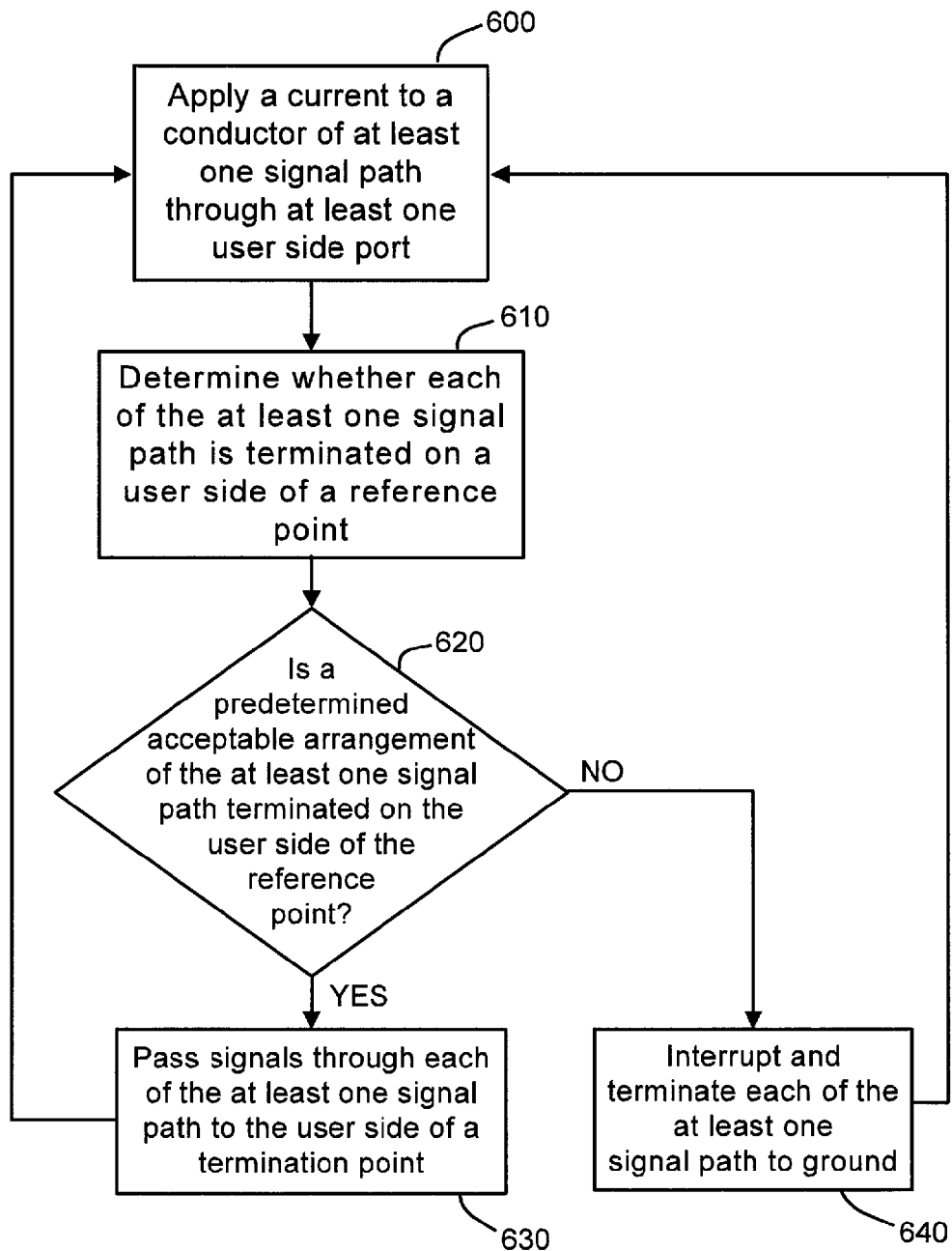
FIG. 6 is a flow chart illustrating the method of terminating a signal path through a user-side port, according to one embodiment of the invention illustrated by FIG. 5.

Referring to FIG. 6, the termination/untermination status of multiple signal paths are considered in determining whether to terminate at a termination circuit 150 positioned upstream from at least one split in an exemplary signal path. For instance, in determining whether to interrupt and terminate at the termination circuit 150 on signal branch 204 in FIG. 5, the termination/untermination status of signal path 202/204/208 and the term ination/untermination status of signal path 202/204/210 can be considered.

First, according to step 600, a current can be applied to a conductor of at least one signal path through at least one user-side port. Continuing with the above example referencing FIG. 5, a current is applied to the signal path 202/204/208, and to the signal path 202/204/210.

Next, according to step 610, it is determined whether the signal paths are terminated to a user side of a reference point. The user side is the downstream side of the reference point, which is also the side of the reference point toward the user-side port. The reference point can be a point in a portion of the termination circuit, such as the termination circuit 150 or the sensor circuit 160. In the continuing example referencing FIG. 5, the sensor circuit 160 on signal branch 204 is the reference point 162. So, the termination circuit 150 on signal branch 208 is on the user side of the reference point 162. Similarly, the termination circuit 150 on signal branch 210 is on the user side of the reference point 162. Any user device connected to user-side port 216 or user-side port 218 is also on the user side of the reference point 162.

According to decision box 620, if the at least one signal path (in this case, signal paths 202/204/208 and 202/204/210) is terminated to the user side of the reference point in a predetermined acceptable arrangement, then according to decision box 630, signals are passed through each of the at least one signal path (in this case, signals are passed through both signal paths 202/204/208 and 202/204/210) to the user side of a termination point. Otherwise, according to step 640, the signal paths (in this case, both signal paths 202/204/208 and 202/204/210) are interrupted and terminated to ground.

The termination point can be at a selected termination circuit 150. In the continuing example, the termination point 152 is at the termination circuit 150 on signal branch 204.

Each predetermined acceptable arrangement of the signal paths terminated to the user side of the reference point is the desired configuration of signal paths terminated to the user side of the reference point that causes a signal path to be interrupted and terminated. The particular arrangement or arrangements are determined to be acceptable by instantiating a particular configuration of the termination circuits 150 and the sensor circuits 160 on the signal branches in the splitter 100, 200 to produce the desired results. The desired results and functionality, as stated herein above, depend, in part, on a balance between reducing material and manufacturing cost, noise ingress, and reflection (e.g., individually or in various (weighted) combinations). It might be an acceptable arrangement to pass signals through each signal path 202/204/208 and 202/204/210 to the user side of the termination point 152 when only one of two possible downstream user-side ports (i.e. 216 or 218) is connected to a user device (not shown). Or it might be an acceptable arrangement to pass signals through each signal path 202/204/208 and 202/204/210 to the user side of the termination point only when each of the downstream user-side ports is connected to a user device. Other variations are also possible.

For illustration purposes, and in continuing with the example referencing FIG. 5, in which the reference point 162 is the sensor circuit 160 on signal branch 204 and the termination point is the termination circuit 150 on the signal branch 204, the predetermined acceptable arrangement is assumed to be the case in which any of the at least one signal paths (in this case, either of signal paths 202/204/208 or 202/204/210) is terminated on the user side of the reference point 162 (e.g., by the associated user-side port 216 or 218 properly connecting to a user device, or by another termination circuit 150 downstream from the reference point). According to this predetermined acceptable arrangement, if user-side port 216 is properly terminated, then signals will be passed through each signal path 202/204/208 and 202/204/210 to the user side of the termination point 152. In other words, signals will be passed through signal branches 202 and 204, at least to the termination circuit 150 on signal branch 208. Likewise, signals will be passed through signal branches 202 and 204, at least to the termination circuit 150 on signal branch 210.

The same result occurs when a user device is connected to user-side port 218. Signals will be passed through each signal path 202/204/208 and 202/204/210 to the user side of the termination point 152, at least to the termination circuit 150 on each of signal branches 208 and 210.

At the termination circuit 150 on signal branch 208 and at the termination circuit 150 on signal branch 210, the respective signals might also be passed, or the respective signal paths 202/204/208 and 202/204/210 might be interrupted and terminated. The method described with respect to FIG. 6 can be applied separately for each signal path 202/204/208 and 202/204/210 in determining whether the signal paths 202/204/208 and 202/204/210 are terminated at the termination circuits 150 on the respective signal branches 208 and 210.

Still referring to the same example referencing FIG. 5, if neither the user-side port 216 nor the user-side port 218 is terminated (e.g., by a user device 48), and neither the signal path 202/204/208 nor the signal path 202/204/210 is terminated by either the termination circuit 150 on signal branch 208 or the termination circuit 150 on signal branch 210, then each signal path 202/204/208 and 202/204/210 will be interrupted and terminated to ground at the termination circuit 150 on signal branch 204, according to step 640.

To further illustrate with this same example referencing FIG. 5, assume the predetermined acceptable arrangement is instead the case in which each of the at least one signal path (in this case, signal path 202/204/208 and signal path 202/204/210) is terminated on the user side of the reference point 162. According to this predetermined acceptable arrangement, if both user-side port 216 and user-side port 218 are terminated, then signals will be passed through each signal path 202/204/208 and 202/204/210 to the user side of the termination point 152. The signals will pass through the signal path 202/204/208 at least to the termination circuit 150 on signal branch 208, and through the signal path 202/204/210 at least to the termination circuit 150 on signal branch 210. As described above, whether the signal paths 202/204/208 and 202/204/210 are terminated at the termination circuit 150 on each of the respective signal branches 208 and 210 can be determined by separately applying the method of FIG. 6 to each case.

If either or both user-side ports 216 or 218 is unterminated (including being unterminated by the termination circuits 150 on signal branches 208 and 210), then the termination circuit 150 on signal branch 204 will interrupt and terminate each signal path 202/204/208 and 202/204/210 to ground, according to step 640.

Possible configurations of signal paths terminated and unterminated (e.g., predetermined acceptable arrangements), beyond those described as examples herein, can be predetermined, to trigger interruption and termination of a termination circuit 150 when one of the predetermined terminated/unterminated signal path configurations exists. To predetermine the configuration, the exemplary method embodiments as described herein can vary, incorporating different logic and accommodating variations in the configuration and placement of the termination circuits. More signal paths can be considered simultaneously, for instance, and signal paths can be interrupted and terminated based upon different logic than that described and/or illustrated in the examples.

In each of the previous two example embodiments, the first example in which the termination circuit 150 on signal branch 204 terminates if neither signal path 202/204/208 nor signal path 202/204/210 is terminated, and the second example in which the termination circuit 150 on signal branch 204 terminates if either signal path 202/204/208 or signal path 202/204/210 is unterminated, the termination circuit 150 does not terminate if both termination circuits 150 on signal branches 208 and 210 do interrupt and terminate their respective signal paths to ground. Terminating at signal branch 204 when termination occurs at each of signal branches 208 and 210 might seem redundant and unnecessary to prevent noise ingress. However, it might be desirable to terminate the signal paths 202/204/208 and 202/204/210 on signal branch 204 as well, in order to lessen reflection. Therefore, such an exemplary extra condition can be included when predetermining the acceptable arrangements to pass signals through the signal paths 202/204/208 and 202/204/210 at the termination point 152.

Figure 7:
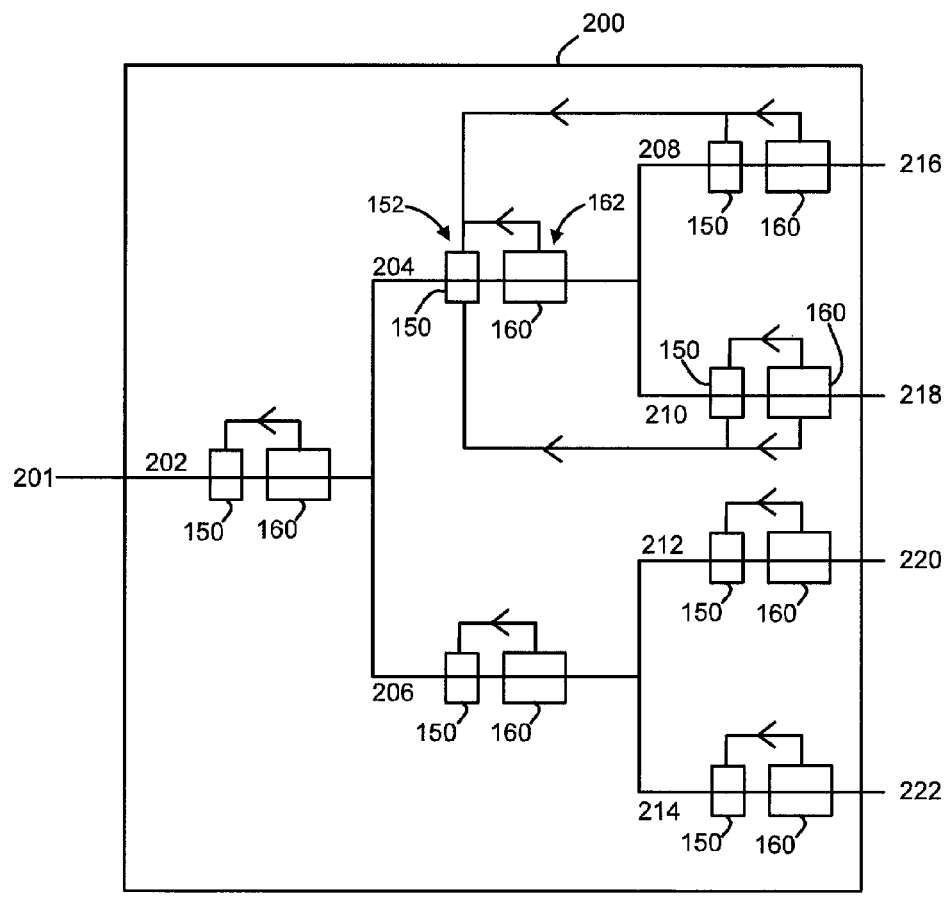
FIG. 7 is a schematic diagram of the splitter illustrated in FIG. 4, according to another alternate embodiment of the invention.
Figure 8:
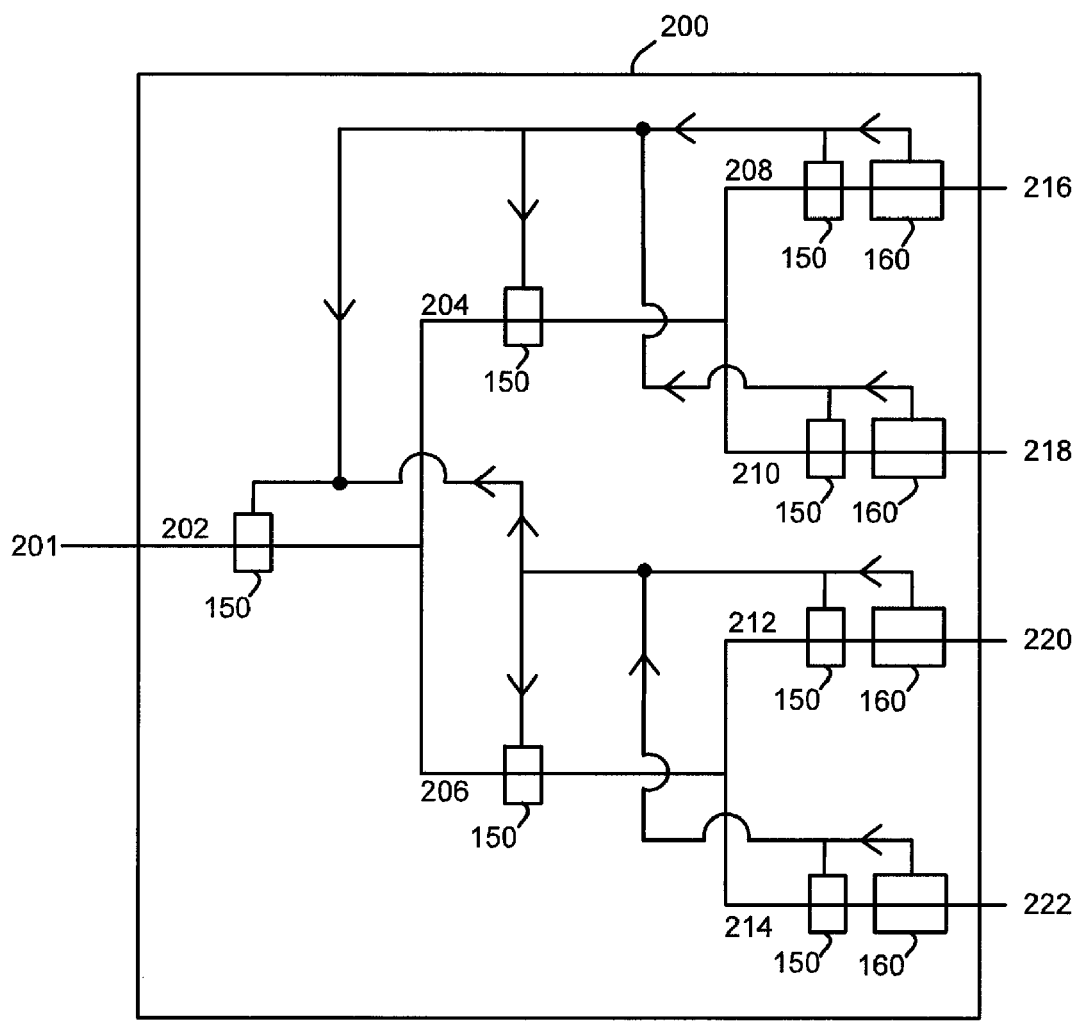
FIG. 8 is a schematic diagram of the splitter illustrated in FIG. 4, according to another alternate embodiment of the invention

Further, configurations to achieve exemplary embodiments according to the invention can be achieved in multiple ways. In one embodiment for instance, the signal circuit 150/160 on signal branch 208 and the signal circuit 150/160 on signal branch 210 can each communicate with the signal circuit 150/160 on signal branch 204, as depicted in FIG. 7. This communication might be used with a logic circuit to terminate the termination circuit 150 on signal branch 204 when each of the other downstream termination circuits 150 terminates on its respective signal branch 208 and 210. One skilled in the art will recognize how to further implement such an embodiment. Additionally, one skilled in the art will recognize other appropriate variations and how to implement them. For example, as shown in FIG. 8, a logic circuit in the termination circuit 150 on signal branches 202, 204, 206, 208, 210, 212, and/or 214 can terminate the corresponding interruptible signal path based on information from sensor circuits 160 on signal branches 216, 218, 220, 222, respectively.

This written description uses examples to disclose exemplary embodiments of the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Further, while in numerous cases herein, wherein systems, apparatuses and methods are described as having a certain number of elements, it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment. For example, aspects or features described with respect to embodiments directed to FIG. 4-5 or 7-8 can be used with embodiments directed to FIG. 2.

What is claimed is:

1. An apparatus for reducing noise ingress, said apparatus comprising:
   at least one interruptible signal path extending from a supplier-side port through a user-side port, each of said interruptible signal paths comprising a conductor and a prescribed signal level connection point;
   a signal source coupled to at least one of said interruptible signal paths, said signal source arranged to provide a signal to said conductor; and
   at least one signal circuit, each signal circuit being arranged in one of said interruptible signal paths, each signal circuit configured to determine, based on a value of said signal, when said interruptible signal path is unterminated, and to interrupt and terminate said interruptible signal path to said prescribed signal level connection point when said interruptible signal path is determined by said signal circuit to be unterminated, wherein each of said signal circuits determines whether at least one of said interruptible signal paths is unterminated by determining an impedance on said conductor, and comparing said impedance to a reference value.

2. The apparatus of claim 1, wherein each interruptible signal path comprises multiple branches, and said signal circuit is positioned on any of said multiple branches.

3. The apparatus of claim 2, wherein each of said signal circuits further comprises:
   a termination circuit positioned on any of said multiple branches; and a sensor circuit positioned on any of said multiple branches.

4. The apparatus of claim 2, wherein each of said signal circuits further comprises:
   a termination circuit positioned on a first branch of a first interruptible signal path; and
   a sensor circuit positioned on a second branch of said first interruptible signal path, wherein said sensor circuit is in signal communication with said termination circuit.

5. The apparatus of claim 1, wherein each signal circuit comprises a signal switching device having at least a first state and a second state, wherein said first state enables an alternating electrical current signal to travel said interruptible signal paths through said user-side ports and said second state terminates said interruptible signal paths from said conductor to said prescribed signal level termination over a terminating signal path having a terminating impedance.

6. The apparatus of claim 5, wherein said state of said signal switching device is determined by a control signal received from a signal comparison device.

7. The apparatus of claim 1, wherein each of said signal circuits determines whether at least one of said interruptible signal paths is terminated by comparing a signal characteristic representative of said signal on said interruptible signal path with a reference value.

8. The apparatus of claim 1, wherein each of said interruptible signal paths is terminated to said prescribed signal level connection point over a terminating signal path having a resistance to match a characteristic impedance of said interruptible signal paths.

9. A signal splitter for reducing noise ingress, said signal splitter comprising:
   an interruptible signal path extending from a supplier-side port through an output of a user-side port, the interruptible signal path comprising one or more signal branches;
   a signal detector to detect a signal level on the interruptible signal path at the user-side port;
   a signal switching device arranged on a first branch of the one or more of signal branches, the signal switching device to selectively interrupt the first branch of the interruptible signal path when the interruptible signal path coupled to the user-side port is unterminated, wherein said signal switching device operates in said first state to maintain the interruptible signal path when a measured voltage at a first input of a signal comparison device connected through a prescribed resistance to the interruptible signal path is below a reference voltage at a second input of the signal comparison device, wherein the signal comparison device is connected in parallel with the interruptible signal path; and
   a coupler circuit to perform AC coupling between the signal detector and the signal switching device, wherein the signal detector, the coupler circuit, and the signal switching circuit connect in series to at least the first branch of the one or more signal branches in the interruptible signal path.

10. The signal splitter of claim 9, wherein the signal switching device is to operate in a second state to interrupt the first branch of the interruptible signal path when the signal level is greater than a threshold, the second state to connect the interrupted interruptible signal path to a prescribed reference level connection point, the signal switching device to receive a control signal from the signal detector to determine in which of the first state and the second state to operate.

11. The signal splitter of claim 10, wherein the signal switching device is connected to receive a control signal from the signal comparison device in the signal detector, the signal comparison device to compare at least one signal characteristic of a signal at the signal comparison device, said signal characteristic being indicative of whether the interruptible signal path coupled to the user-side port is terminated.

12. The signal splitter of claim 10, wherein the signal switching device is in the first state when a user device draws a current greater than a reference current value 13. A method of terminating a port to prevent noise ingress comprising the steps:
   applying a current to a conductor of at least one interruptible signal path through at least one user-side port, each of said interruptible signal paths including one or more signal branches;
   determining whether each of said interruptible signal paths is terminated on a user side of a reference point; and
   interrupting and terminating each of said interruptible signal paths at a termination point when said interruptible signal paths are unterminated on the user side of a reference point in a predetermined acceptable arrangement, wherein at least one termination circuit is configured to interrupt and terminate one or more of said interruptible signal paths at one or more of said signal branches when a user device draws a current greater than a reference current value.

14. The method of claim 13, wherein said reference point is a termination circuit.

15. The method of claim 13, wherein determining whether said interruptible signal path is unterminated is accomplished automatically by at least one sensor circuit positioned in at least one of said signal branches.

16. The method of claim 15, wherein each of said sensor circuits is configured to compare at least one signal characteristic representative of a signal in said interruptible signal path with at least one reference value.

17. The method of claim 15, wherein each of said sensor circuits comprises a signal comparison device for determining whether a user device draws a current sufficient to cause a voltage drop that lowers a measured voltage at said signal comparison device below a reference voltage at said signal comparison device.

18. The method of claim 13, wherein determining whether said interruptible signal path is unterminated at one or more of said signal branches is done by comparing at least one signal characteristic representative of a signal in said interruptible signal path with at least one reference value.

19. The method of claim 13, wherein at least one termination circuit is configured to interrupt and terminate one or more of said interruptible signal paths at one or more of said signal branches when a user device draws a current sufficient to cause a voltage drop and lower a measured voltage at a signal comparison device below a threshold voltage at said signal comparison device, wherein said signal comparison device is connected in parallel to said interruptible signal path.

* * * * *